(12) United States Patent
Kim et al.

(10) Patent No.: US 9,551,502 B2
(45) Date of Patent: Jan. 24, 2017

(54) HYBRID VENTILATION APPARATUS CAPABLE OF BOTH NATURAL AND FORCED VENTILATION

(75) Inventors: Hak Sung Kim, Seoul (KR); Hak Guym Kim, Seoul (KR); Yun Gyu Lee, Goyang-si (KR)

(73) Assignees: KOREA INSTITUTE OF CONSTRUCTION TECHNOLOGY, Goyang-si (KR); PEOPLUS CO., LTD, Seoul (KR); HUTECO CO., LTD., Seoul (KR)

( * ) Notice: Subject to any disclaimer, the term of this patent is extended or adjusted under 35 U.S.C. 154(b) by 487 days.

(21) Appl. No.: 14/343,501

(22) PCT Filed: Mar. 20, 2012

(86) PCT No.: PCT/KR2012/001986
§ 371 (c)(1),
(2), (4) Date: Mar. 7, 2014

(87) PCT Pub. No.: WO2013/035950
PCT Pub. Date: Mar. 14, 2013

(65) Prior Publication Data
US 2014/0248831 A1  Sep. 4, 2014

(30) Foreign Application Priority Data
Sep. 8, 2011 (KR) ........................ 10-2011-0090987

(51) Int. Cl.
*F24F 11/00* (2006.01)
*F24F 7/00* (2006.01)
(Continued)

(52) U.S. Cl.
CPC .............. *F24F 11/0017* (2013.01); *F24F 7/00* (2013.01); *F24F 7/013* (2013.01); *F24F 7/08* (2013.01);
(Continued)

(58) Field of Classification Search
CPC ....... F24F 2007/004; F24F 7/004; F24F 7/013
(Continued)

(56) References Cited

U.S. PATENT DOCUMENTS 2,935,007 A * 5/1960 Mercatanti ............... A62C 2/12
454/256
4,545,363 A * 10/1985 Barchechat ............ A62C 2/247
126/285 B
(Continued)

FOREIGN PATENT DOCUMENTS

JP     2001032646    2/2001
KR     200380523     3/2005
(Continued)

OTHER PUBLICATIONS

International Search Report—PCT/KR2012/001986 dated Oct. 25, 2012.

*Primary Examiner* — Avinash Savani
*Assistant Examiner* — Vivek Shirsat
(74) *Attorney, Agent, or Firm* — Cantor Colburn LLP

(57) ABSTRACT

Disclosed herein is a hybrid ventilation apparatus capable of both natural and forced ventilation. In the case of a natural ventilation mode, a worm gear is rotated in a normal direction by drive force of a drive unit under control of a control unit so that a pressing member engages with a rotation guide protrusion and rotates a damper, thus opening a flow passage, and then the worm gear is reversely rotated by drive force of the drive unit to return the pressing member to its original position, thus allowing a user to rotate a roller upwards and downwards and rotate the damper so that the degree of opening of the flow passage can be adjusted. Thereby, rapid inflow of outdoor air can be blocked, and a cold graft phenomenon, in which the temperature of indoor air rapidly drops, can be prevented.

12 Claims, 17 Drawing Sheets

(51) Int. Cl.
*F24F 13/10* (2006.01)
*F24F 7/013* (2006.01)
*F24F 7/08* (2006.01)
*F24F 12/00* (2006.01)

(52) U.S. Cl.
CPC ............ *F24F 12/006* (2013.01); *F24F 13/10* (2013.01); *F24F 13/105* (2013.01); *F24F 2007/003* (2013.01); *F24F 2007/004* (2013.01); *F24F 2011/0026* (2013.01); *F24F 2011/0038* (2013.01); *Y02B 30/563* (2013.01)

(58) Field of Classification Search
USPC .................. 454/196, 197, 201, 239, 241, 250–252,454/333, 339, 358, 369
See application file for complete search history.

(56) References Cited

U.S. PATENT DOCUMENTS 4,625,628 A * 12/1986 Ikemura .................. F24F 7/013
 165/54
4,644,990 A * 2/1987 Webb, Sr. ................. E06B 9/32
 160/176.1 P

FOREIGN PATENT DOCUMENTS

| KR | 1020090040656 | 4/2009 |
|---|---|---|
| KR | 2020090010339 | 10/2009 |
| KR | 100964979 | 6/2010 |

\* cited by examiner

HYBRID VENTILATION APPARATUS CAPABLE OF BOTH NATURAL AND FORCED VENTILATION

TECHNICAL FIELD

The present invention relates, in general, to hybrid ventilation apparatuses capable of both natural and forced ventilation and, more particularly, to a hybrid ventilation apparatus capable of both natural and forced ventilation in which, in the case of a natural ventilation mode, a worm gear is rotated in a normal direction by drive force of a drive unit under the control of a control unit such that a pressing member engages with a rotation guide protrusion and rotates a damper, thus opening a flow passage, and then the worm gear is reversely rotated by drive force of the drive unit to return the pressing member to its original position, thus allowing a user to rotate a roller upwards or downwards, thereby rotating the damper such that the degree the flow passage opening can be adjusted, whereby rapid inflow of outdoor air can be blocked, and a cold graft phenomenon, in which the temperature of indoor air rapidly drops, can be prevented.

BACKGROUND ART

Generally, in structures such as buildings or apartments, windows are mainly used to ventilate contaminated indoor air. However, such a ventilation method is disadvantageous in that outdoor air is rapidly drawn indoors and air conditioned indoor air is easily exhausted through a window. This results in low thermal efficiency.

In an effort to overcome the above-mentioned problem, a hybrid ventilation apparatus is proposed in Korean Patent Registration No. 0964979.

In this conventional technique, a mounting plate having a through hole is installed in a housing. An on-off plate having a through hole therein is provided on the mounting plate. When the on-off plate is operated by a motor so that the through hole of the on-off plate is aligned and communicated with the through hole of the mounting plate, natural ventilation is conducted. Forced ventilation is carried out in such a way that indoor air and outdoor air are drawn by a supply fan and an exhaust fan, a heat exchanger exchanges heat between the indoor air and outdoor air, and then the heat exchanged air is discharged indoors and outdoors.

As such, in the conventional technique, when natural ventilation is required, the motor is operated to horizontally communicate the through hole of the mounting plate with the through hole of the on-off plate. However, it is impossible for a user to adjust the degree of opening of the through holes depending on airflow conditions. Therefore, the conventional apparatus cannot cope with strong wind. In the event of rain, rainwater may enter the housing, thus causing a malfunction of the apparatus. Furthermore, because low temperature outdoor air is directly drawn indoors and the temperature of indoor air rapidly decreases, there is a problem of low thermal efficiency.

In addition, the heat exchanger is installed on a base plate and is brought into contact with a sidewall of the housing that is disposed outdoors. Therefore, high or low temperature outdoor air is directly applied to the heat exchanger. Thereby, heat exchange efficiency of the heat exchanger is markedly reduced. Moreover, a severe dew condensation phenomenon is caused, and mildew forms, thus affecting the health of the user. Furthermore, a filter can filter out coarse dust from outdoor air but cannot remove fine dust such as yellow dust. If such fine dust enters the heat exchanger and contaminates it, the lifetime thereof is reduced. Furthermore, because the total heat exchanger contracts and expands depending on the variation in temperature of outdoor air, the airtightness cannot be ensured. As a result, the product reliability is markedly reduced, considering characteristics of the apparatus in which supply of air and exhaust of air are conducted at the same time.

DISCLOSURE

Technical Problem

Accordingly, the present invention has been made keeping in mind the above problems occurring in the prior art, and an object of the present invention is to provide a hybrid ventilation apparatus capable of both natural and forced ventilation in which, in the case of a natural ventilation mode, a worm gear is rotated in a normal direction by drive force of a drive unit under control of a control unit so that a pressing member which protrudes from the worm gear engages with a rotation guide protrusion and rotates a damper, thus opening a flow passage, and then the worm gear is reversely rotated by drive force of the drive unit to return the pressing member to its original position, thus allowing a user to rotate a roller upwards and downwards and rotate the damper so that the degree of opening of the flow passage can be adjusted, whereby rapid inflow of outdoor air can be blocked, and a cold graft phenomenon in which the temperature of indoor air rapidly drops can be prevented.

Another object of the present invention is to provide a hybrid ventilation apparatus capable of both natural and forced ventilation in which a forced ventilation member provided with a heat exchange element is brought into contact with a sidewall of a housing that is disposed in the indoor side of the building so that the heat exchange element can be prevented from being deformed by variation in temperature of outdoor air.

Technical Solution

In order to accomplish the above objects, the present invention provides a hybrid ventilation apparatus for naturally and forcedly ventilate indoor air of a building, including: a housing having a base plate on which a natural ventilation unit for naturally ventilating indoor air of the building and a forced ventilation unit for forcedly ventilating the indoor air are installed, and a cover mounted to the base plate, the cover receiving and protecting the natural ventilation unit and the forced ventilation unit therein, with an inlet port provided on the cover, the inlet port being open downwards; a natural ventilation unit installed in the housing, the a natural ventilation unit having therein flow passage communicating with the inlet port, wherein a worm gear is rotated in a normal direction by drive force of a drive unit under control of the control unit and, simultaneously, pressing members that protrude from the worm gear engage with rotation guide protrusions and rotates dampers and open the flow passage, and after the flow passage has been opened, the worm gear is reversely rotated by drive force of the drive unit to return the pressing members to original positions thereof, and rollers and are rotated upwards or downwards by a user so that the dampers and are rotated, whereby a degree of opening of the flow passage is adjusted such that the indoor air is naturally ventilated through the flow passage; and a forced ventilation unit comprising a forced ventilation member provided above the natural ventilation unit and closely mounted to a sidewall of the housing that is in an indoor side of the building, the forced ventilation unit having a heat exchange element therein, the forced ventilation unit comprising a supply fan and an exhaust fan rotating to forcedly ventilate the indoor air under control of the control unit.

Advantageous Effects

According to the present invention, in the case of a natural ventilation mode, a worm gear is rotated in a normal direction by drive force of a drive unit under control of a control unit so that a pressing member engages with a rotation guide protrusion and rotates a damper, thus opening a flow passage. Thereafter, the worm gear is reversely rotated by drive force of the drive unit to return the pressing member to its original position, thus allowing a user to rotate a roller upwards and downwards and rotate the damper so that the degree of opening of the flow passage can be adjusted. Thereby, rapid inflow of outdoor air can be blocked, and a cold graft phenomenon in which the temperature of indoor air rapidly drops can be prevented.

Furthermore, a forced ventilation member, in which a heat exchange element is installed, is brought into contact with a sidewall of a housing that is disposed in the indoor side of the building. Thus, the heat exchange element can be prevented from being deformed by variation in temperature of outdoor air, whereby the airtightness of the apparatus can be ensured. In addition, the apparatus according to the present invention includes a filter which has a double filtering structure in which a high efficiency filter is covered with a prefilter. The filter can filter out not only coarse dust but also fine dust such as yellow dust from outdoor air, thus preventing the heat exchange element from being contaminated, and thereby preventing the lifetime of the heat exchange element from being shortened. Therefore, product reliability can be enhanced. Furthermore, in the present invention, an inlet port of the housing is open downwards. Hence, even in the case of rain, which can cause malfunction, rainwater can be prevented from entering housing.

DESCRIPTION OF THE REFERENCE NUMERALS IN THE DRAWINGS

Figure 1:
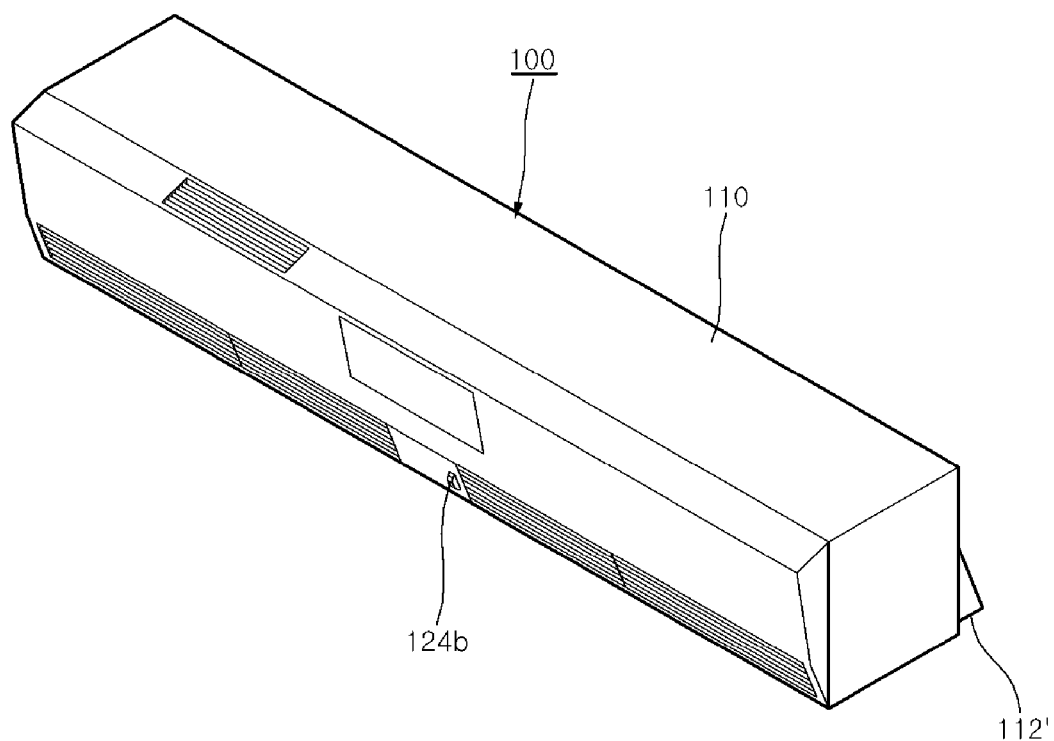
FIG. 1 is a perspective view illustrating the present invention.

100: ventilation apparatus 110: housing
111: base plate 112: cover
113: guide hole 120: natural ventilation unit
121, 121': natural ventilation member 122, 122': damper
123: drive unit 124: manual adjustment unit
130: forced ventilation unit
131: forced ventilation member
132: heat exchange element
133a, 133b: supply fan, exhaust fan
134: filter 140: control unit
150: sensor 160: carbon dioxide sensor

BEST MODE

Figure 2:
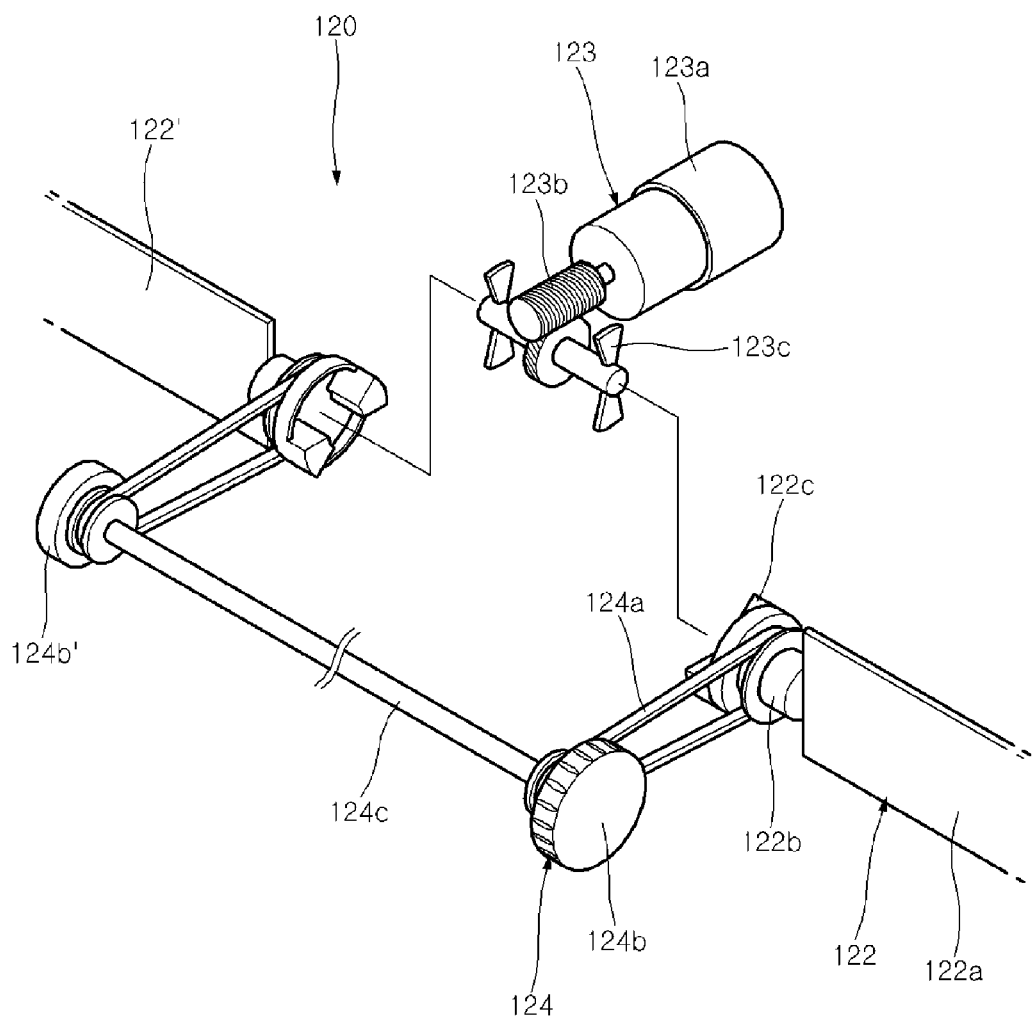
FIG. 2 is an exploded perspective view of a natural ventilation unit according to the present invention.
Figure 3:
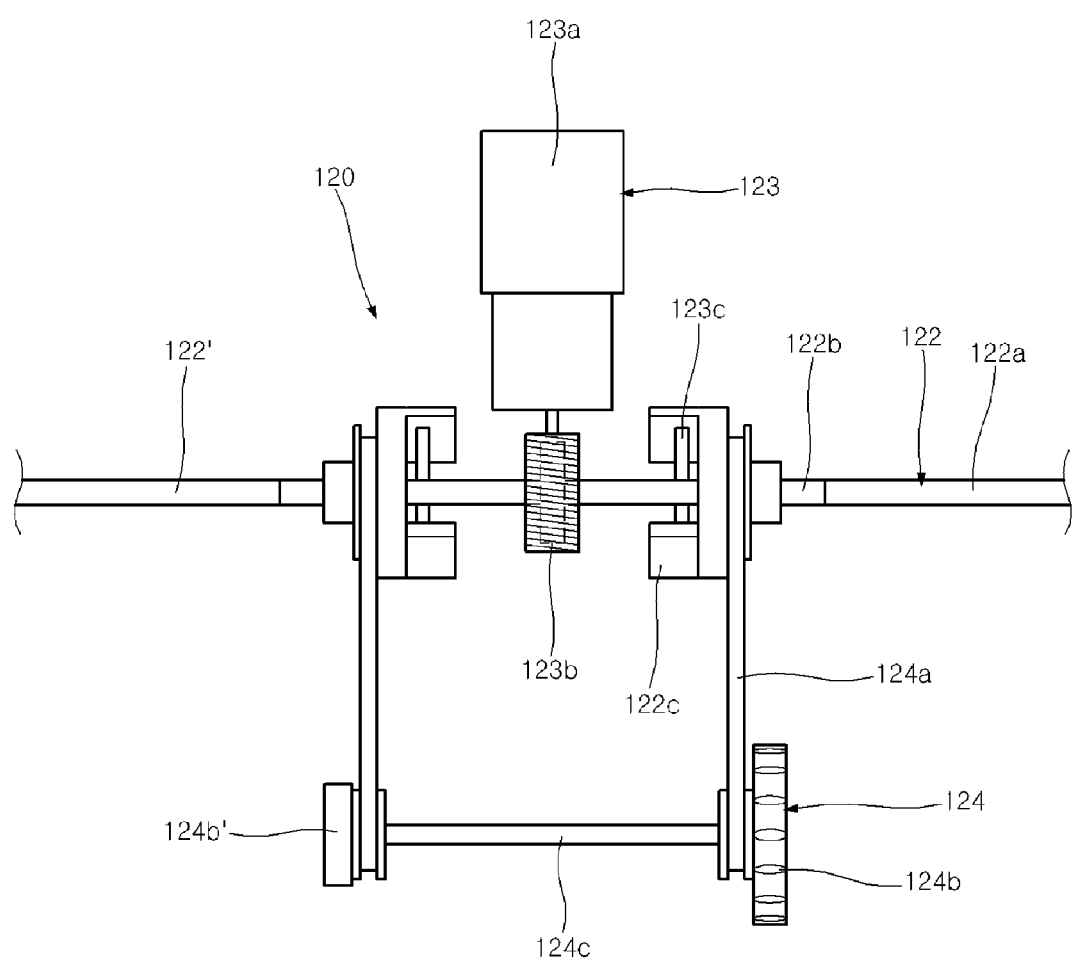
FIG. 3 is a plan view of FIG. 2.
Figure 4:
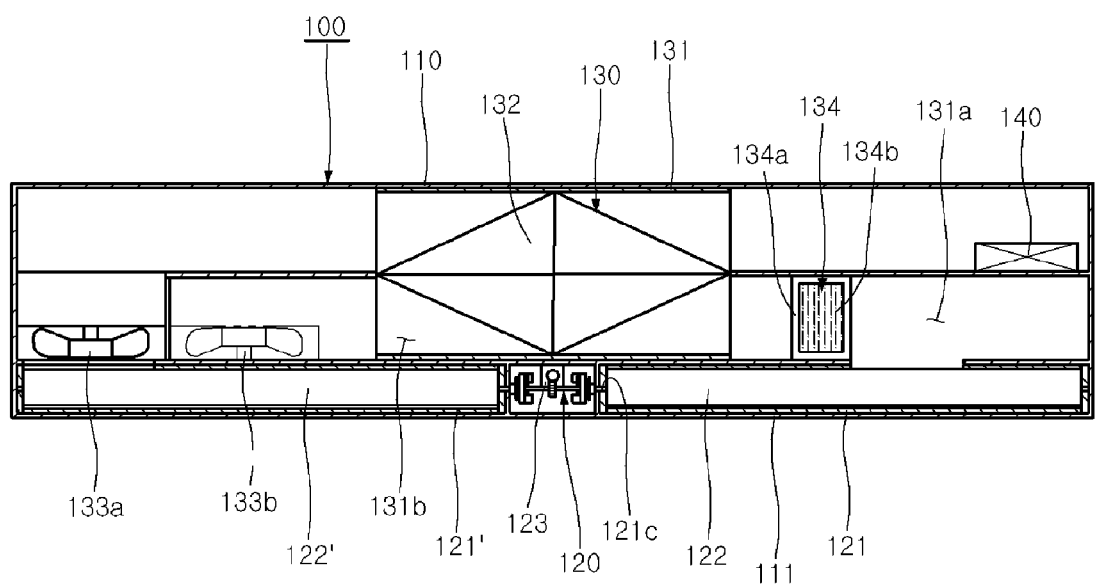
FIG. 4 is a front view showing the construction of the present invention.
Figure 5:
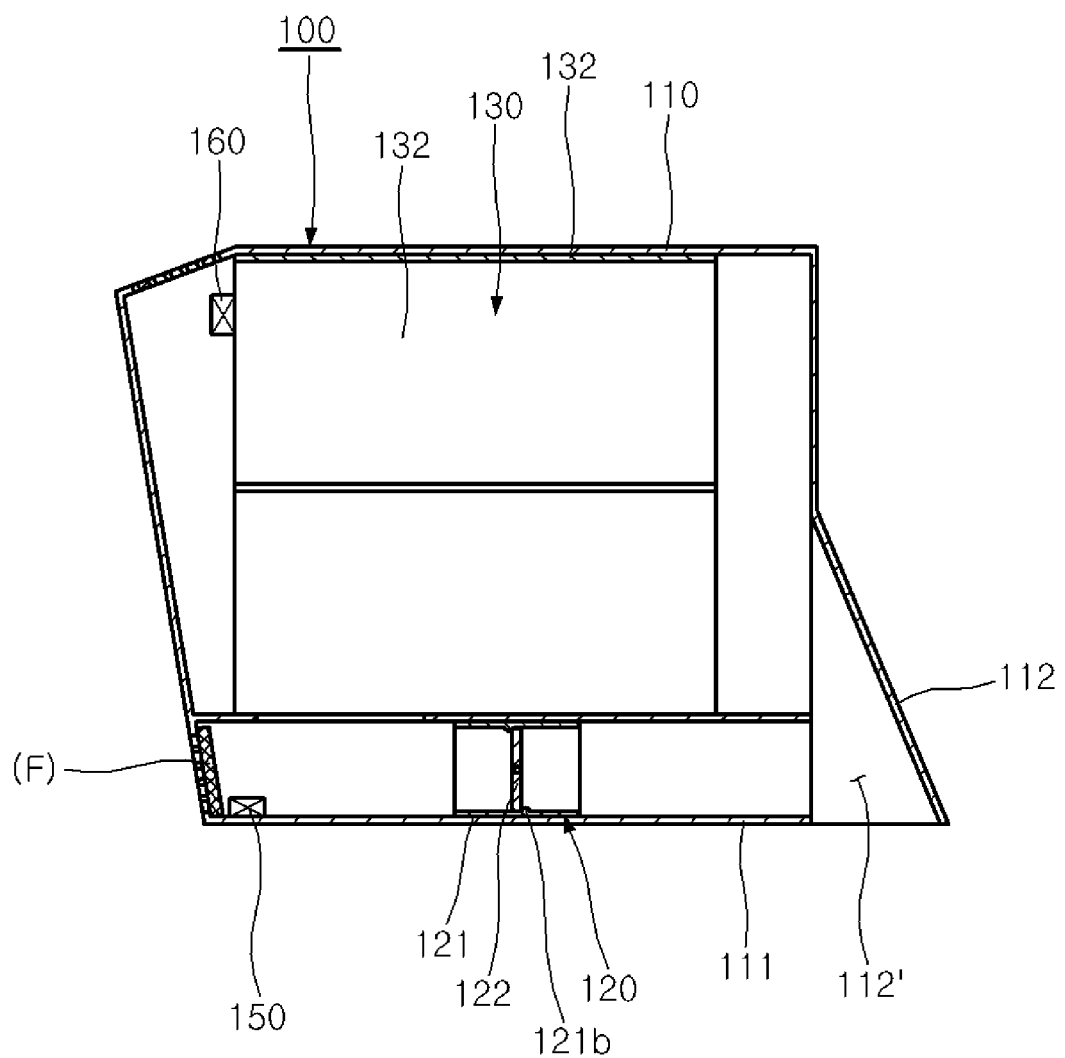
FIG. 5 is a side view showing the construction of the present invention.
Figure 6:
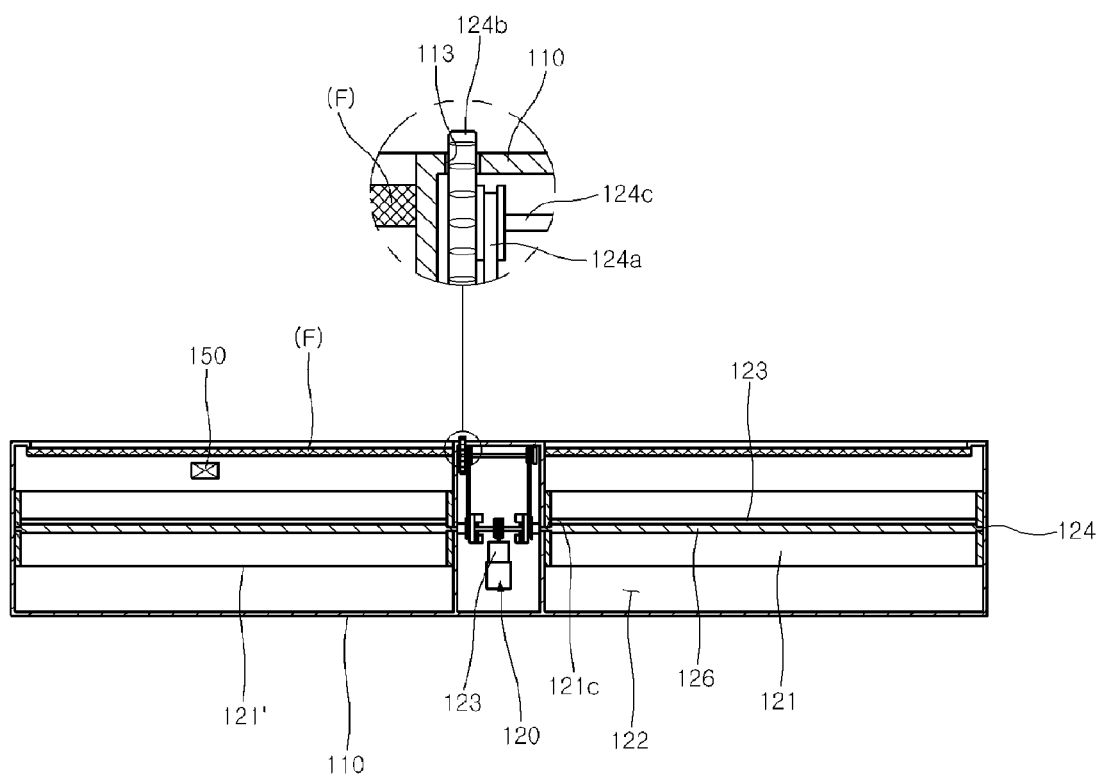
FIG. 6 is a plan sectional view showing the construction of the natural ventilation unit according to the present invention.
Figure 7:
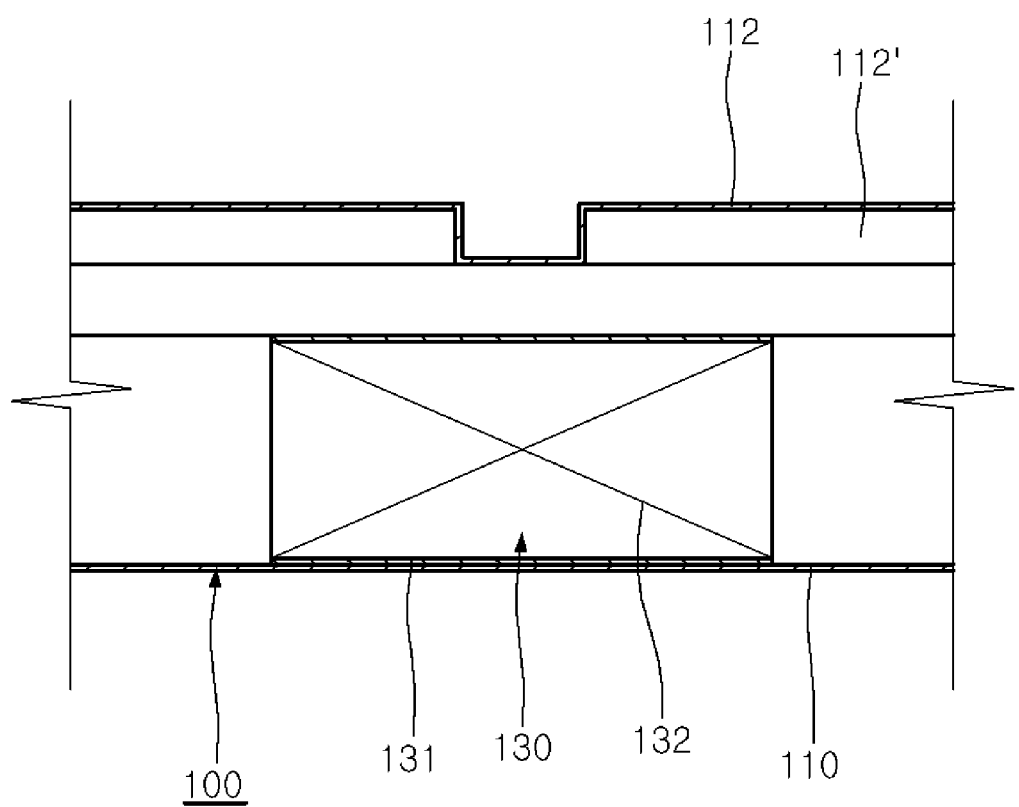
FIG. 7 is a plan sectional view showing the construction of a forced ventilation unit according to the present invention.
Figure 8:
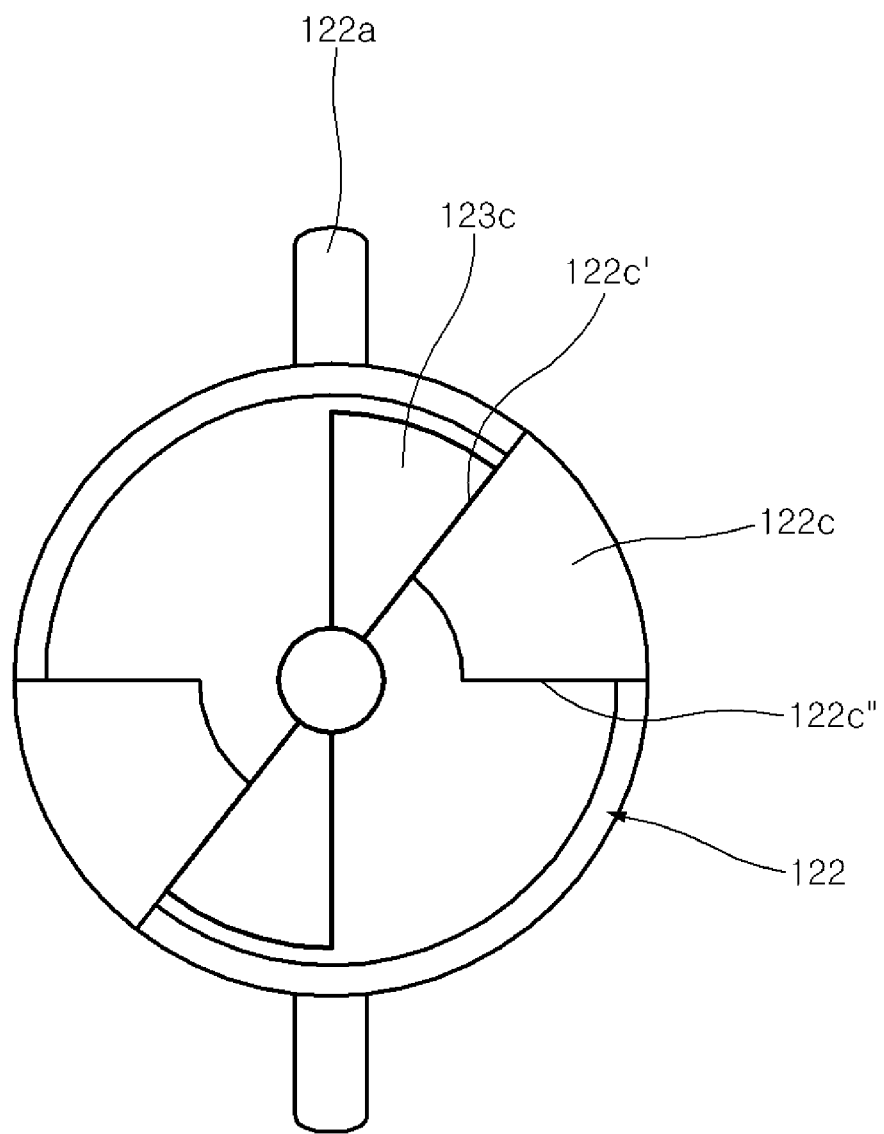
FIGS. 8 through 11 are views showing the operation of the natural ventilation unit according to the present invention.
Figure 9:
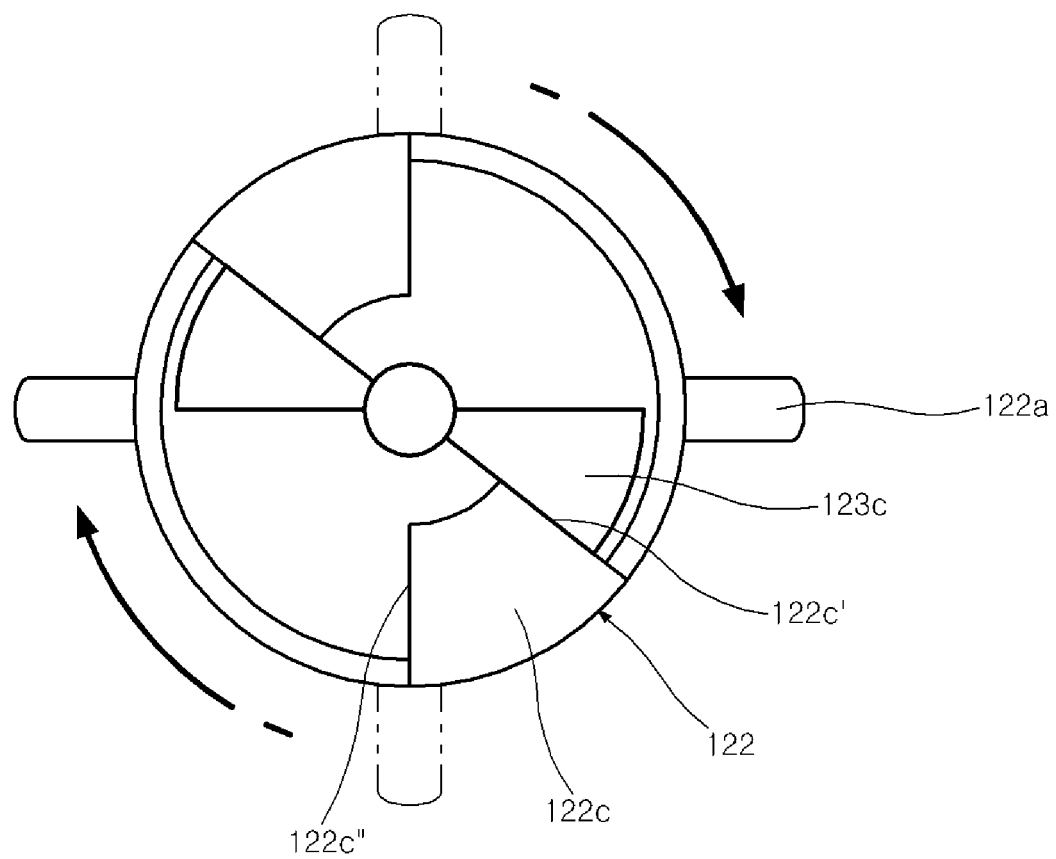
Figure 10:
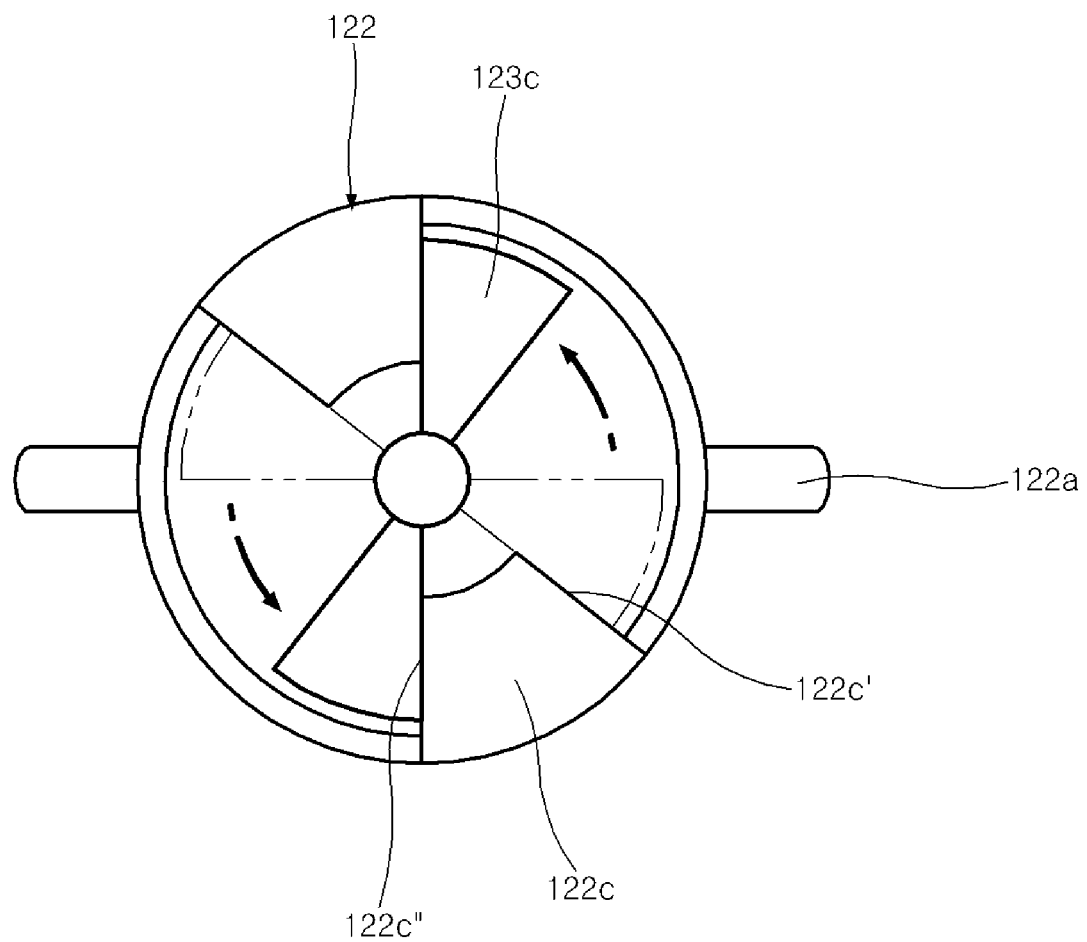
Figure 11:
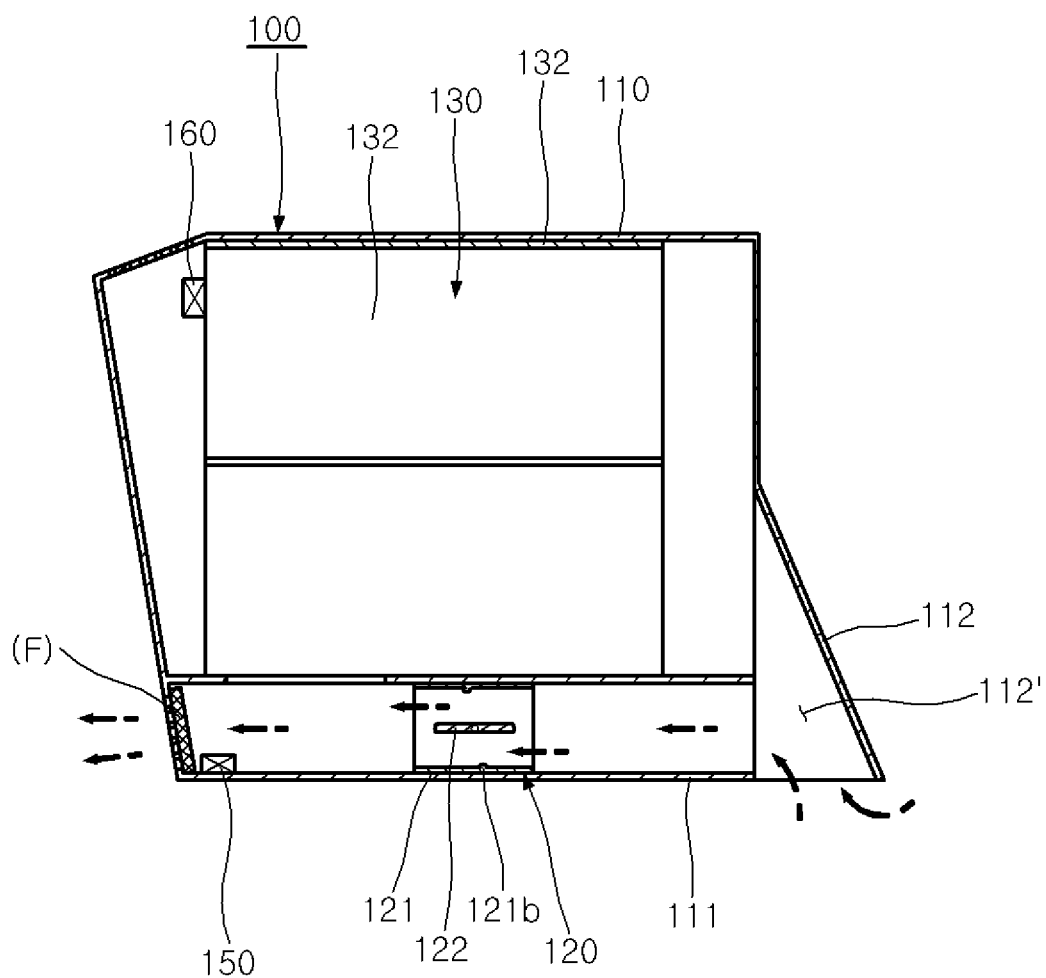
Figure 12:
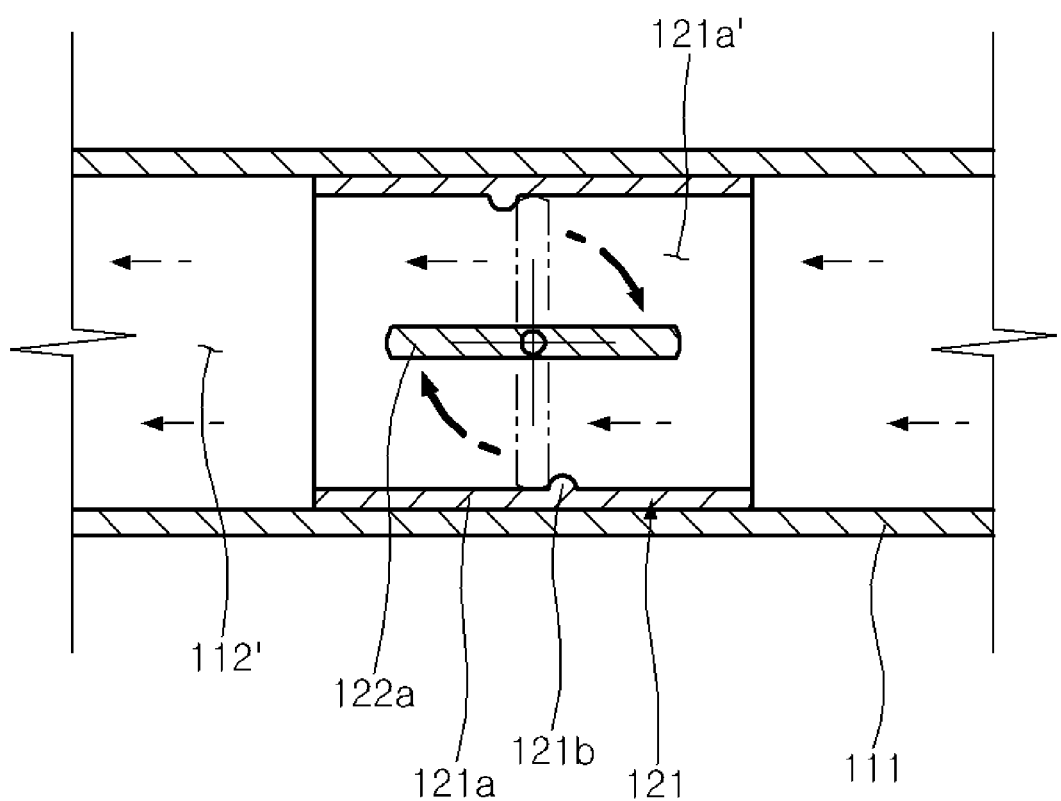
FIG. 12 is an enlarged view showing a portion of FIG. 11.

Hereinafter, an embodiment of the present invention will be described in detail with reference to the attached drawings. FIG. 1 is a perspective view illustrating the present invention. FIG. 2 is an exploded perspective view of a natural ventilation unit according to the present invention. FIG. 3 is a plan view of FIG. 2. FIG. 4 is a front view showing the construction of the present invention. FIG. 5 is a side view showing the construction of the present invention. FIG. 6 is a plan sectional view showing the construction of the natural ventilation unit according to the present invention. FIG. 7 is a plan sectional view showing the construction of a forced ventilation unit according to the present invention.

The hybrid ventilation apparatus capable of both natural and forced ventilation according to the present invention is a ventilation apparatus 100, which naturally and forcedly ventilates indoor air of a building. The ventilation apparatus 100 includes a housing 110 which has a based plate 111 and a cover 112. A natural ventilation unit 120 which naturally ventilates indoor air of the building and a forced ventilation unit 130 which forcedly ventilates indoor air are installed on the base plate 111. Having an inlet port 112' which is open on a lower end thereof, the cover 112 is mounted on the base plate 111. The natural ventilation unit 120 and the forced ventilation unit 130 are disposed in and protected by the cover 112. The ventilation apparatus 100 further includes a natural ventilation unit 120 which is installed in the housing 110 in such a way that the inlet port 112' communicates with a flow passage 121a'. In the natural ventilation unit 120, a worm gear 123b is rotated in a normal direction by drive force of a drive unit 123 under control of the control unit 140 and, simultaneously, pressing members 123c that protrude from the worm gear 123b engage with rotation guide protrusions 122c and rotates dampers 122 and 122', thus opening the flow passage 121a'. Thereafter, the worm gear 123b is reversely rotated by drive force of the drive unit 123 to return the pressing members 123c to their original positions. Rollers 124b and 124b' are rotated upwards or downwards by a user so that the dampers 122 and 122' are rotated, whereby the degree of opening of the flow passage 121a' is adjusted. As a result, indoor air is naturally ventilated through the flow passage 121'a. The ventilation apparatus 100 further includes a forced ventilation unit 130 in which a forced ventilation member 131 having a heat exchange element 132 therein is installed above the natural ventilation unit 120 and is closely mounted to a portion of a sidewall of the housing 110 that is in the indoor side of the building. The forced ventilation unit 130 includes a supply fan 133a and an exhaust fan 133b which rotate under control of the control unit 140 to forcedly ventilate indoor air. The construction of the ventilation apparatus 100 will be described in more detail.

The natural ventilation unit 120 includes a pair of natural ventilation members 121 and 121' which are installed on the base plate 111 of the housing 110 in such a way that the natural ventilation members 121 and 121' face with each other and the inlet port 112' and the flow passage 121a' communicate with each other. The natural ventilation unit 120 further includes the dampers 122 and 122' which are respectively provided in the natural ventilation members 121 and 121'. The dampers 122 and 122' are rotated by pressurization of the pressing members 123c that are rotated by the drive force of the drive unit 123, thus opening or closing the flow passage 121a'. The natural ventilation unit 120 further includes a manual adjustment unit 124 which rotates, upwards or downwards, the dampers 122 and 122' that have been rotated to open the flow passage 121a', thus adjusting the degree of opening of the flow passage 121a'.

Each of the natural ventilation members 121 and 121' includes a rectangular ventilation body 121a through which the flow passage 121a' is formed, and a flow passage closing protrusion 121b which is provided on an inner surface of the flow passage 121a' of the ventilation body 121a so that the damper 122, 122' which is reversely rotated under control of the control unit 140 comes into close contact with the flow passage closing protrusion 121b so as to close the flow passage 121a'. Rotation guide holes 121c are formed in respective opposite ends of the ventilation body 121a so that the corresponding damper 122, 122' is rotatably installed in the ventilation body 121a by the rotation guide holes 121c.

Each of the dampers 122 and 122' includes an on-off plate 122a which opens or closes the flow passage 121a', rotation guide shafts 122b which are provided on respective opposite ends of the on-off plate 122a and disposed in the respective rotation guide holes 121c of the natural ventilation member 121, and rotation guide protrusions 122c which protrude from ends of the respective rotation guide shafts 122b and face each other.

The drive unit 123 includes a motor 123a which is provided with an output shaft, the worm gear 123b which is coupled to the output shaft for transmission of the drive force of the motor 123a, and the pressing members 123c which are connected to the worm gear 123b and extend in a direction crossing the output shaft. The pressing members 123c function to press the rotation guide protrusions 122c of the corresponding dampers 122 and 122'.

The manual adjustment unit 124 includes timing belts 124a which respectively connect the rollers 124b and 124b' to the rotation guide shafts 122b of the dampers 122 and 122', the rollers 124b and 124b' which are connected to the timing belts 124a to rotate the corresponding dampers 122 and 122', and a connection shaft 124c which connects the rollers 124b and 124b' to each other.

Preferably, an end of any one of the rollers 124b and 124b' protrudes out of the housing 110 through a guide hole 113 formed in the housing 110.

The forced ventilation unit 130 includes the forced ventilation member 131, the heat exchange element 132, the supply fan 133a and the exhaust fan 133b. The forced ventilation member 131 is provided above the natural ventilation unit 120 and has an inlet passage 131a and an exhaust passage 131b which are formed crossing each other.

The heat exchange element 132 is disposed at a junction between the inlet passage 131a and the exhaust passage 131b so that heat exchange between air that flows through the inlet passage 131a and the exhaust passage 131b is conducted in the heat exchange element 132. The supply fan 133a and the exhaust fan 133b are respectively installed in a rear end of the inlet passage 131a and a front end of the exhaust passage 131b so as to move air.

The ventilation apparatus 100 further includes a filter 134 which is provided in a front end of the inlet passage 131a so as to filter out impurities from air.

The filter 134 has a double filtering structure in which a high efficiency filter 134a is covered with a prefilter 134b.

The inlet passage 131a and a rear end of the exhaust passage 131b respectively communicate with the flow passage 121a' of the natural ventilation members 121 and 121'.

The ventilation apparatus 100 further includes an air flow sensor 150 which is installed in an end of the flow passage 121a' and measures the flow and pressure of air.

The ventilation apparatus 100 further includes a carbon dioxide sensor 160 which is provided at a predetermined position in the housing 110. The carbon dioxide sensor 160 measures the degree of pollution of indoor air to determine whether operating the forced ventilation unit 130 under the control of the control unit 140.

The operation of the apparatus according to the present invention having the above-mentioned construction will be explained.

When natural ventilation is required depending on the degree of pollution of indoor air that is measured by the carbon dioxide sensor 160, as shown in FIGS. 8 through 12, the natural ventilation unit 120 is operated under the control of the control unit 140 in response to the result of measurement using the carbon dioxide sensor 160 and a temperature sensor (not shown). The natural ventilation unit 120 operates the motor 123a of the drive unit 123 in the normal direction under the control of the control unit 140.

Then, the pressing members 123c, which are connected to the worm gear 123b and extend in a direction crossing the output shaft of the motor 123a, rotate in the normal direction and press corresponding first surfaces 122c' of the rotation guide protrusions 122c of the dampers 122 and 122'. Thereby, the rotation guide shafts 122b provided with the rotation guide protrusions 122c rotates in the corresponding rotation guide holes 121c. The on-off plates 122a which are integrally provided with the respective rotation guide shafts 122b rotate in the normal direction, so that edges of the on-off plates 122a move away from the flow passage closing protrusions 121b. As a result, the flow passage 121a' of the natural ventilation members 121 and 121' is opened. Here, the motor 123a of the drive unit 123 is rotated in the normal direction to 90° from the set state such that the on-off plates 122a of the dampers 122 and 122' are maintained parallel to the ventilation bodies 121a.

After the flow passage 121a' of the natural ventilation members 121 and 121' has been opened by the rotation of the dampers 122 and 122', when the motor 123a of the drive unit 123 is reversely operated under the control of the control unit 140, the worm gear 123b coupled to the output shaft of the motor 123a is also reversely rotated. The pressing members 123c connected to the worm gear 123b is reversely rotated by the reverse rotation of the worm gear 123b and is brought into contact with second surfaces 122c" of the rotation guide protrusions 122c.

Through the inlet port 112' which is formed in the cover 112 of the housing 110 and is open downwards, outdoor air is drawn into the flow passage 121a' that has been opened through the above-mentioned process. The outdoor air is supplied into the interior of the building via the air flow sensing sensor 150 provided on the end of the flow passage 121a' after passing through the prefilter F.

Figure 13:
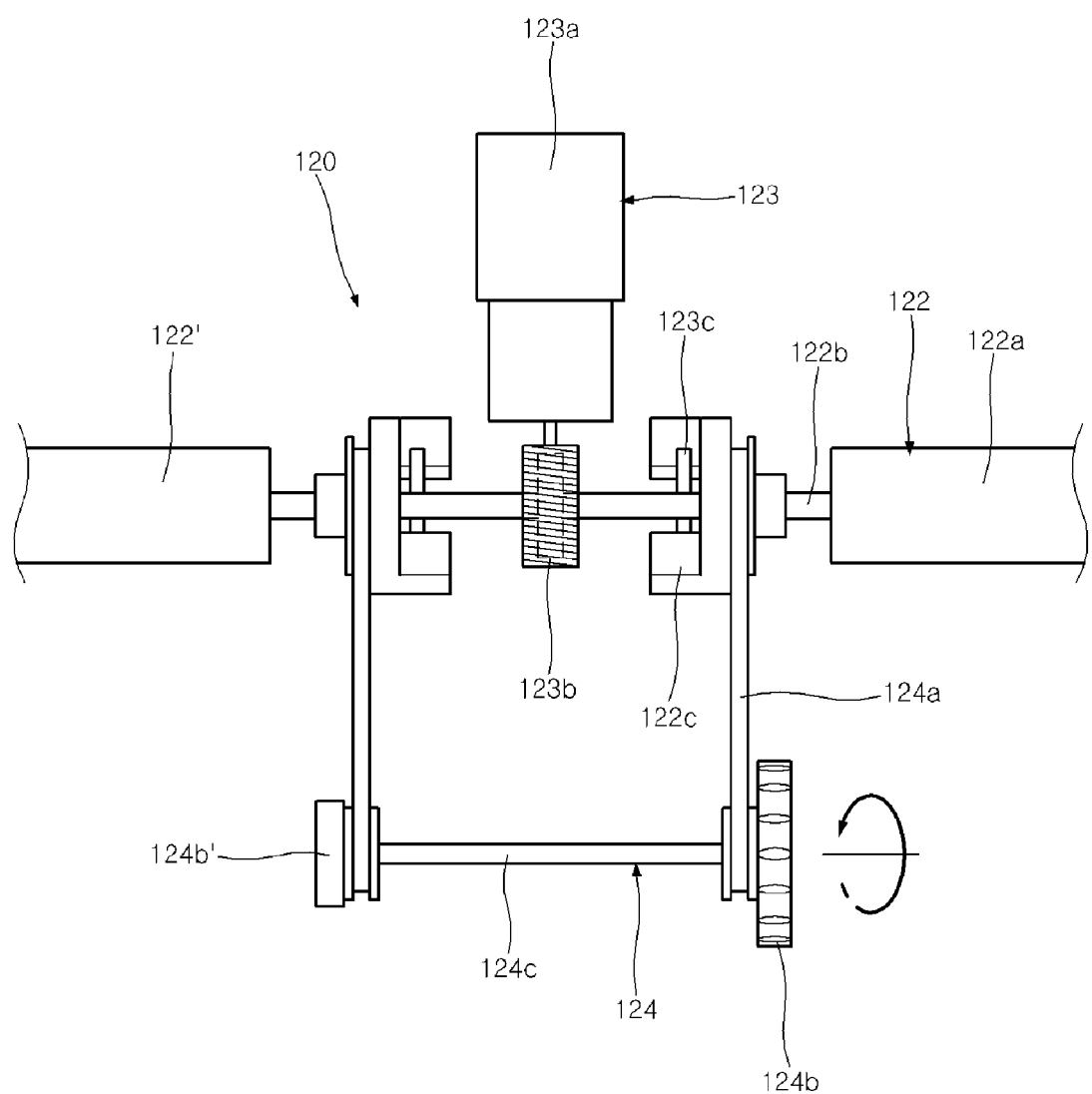
FIGS. 13 and 14 are views showing the operation of a manual adjustment unit according to the present invention.
Figure 14:
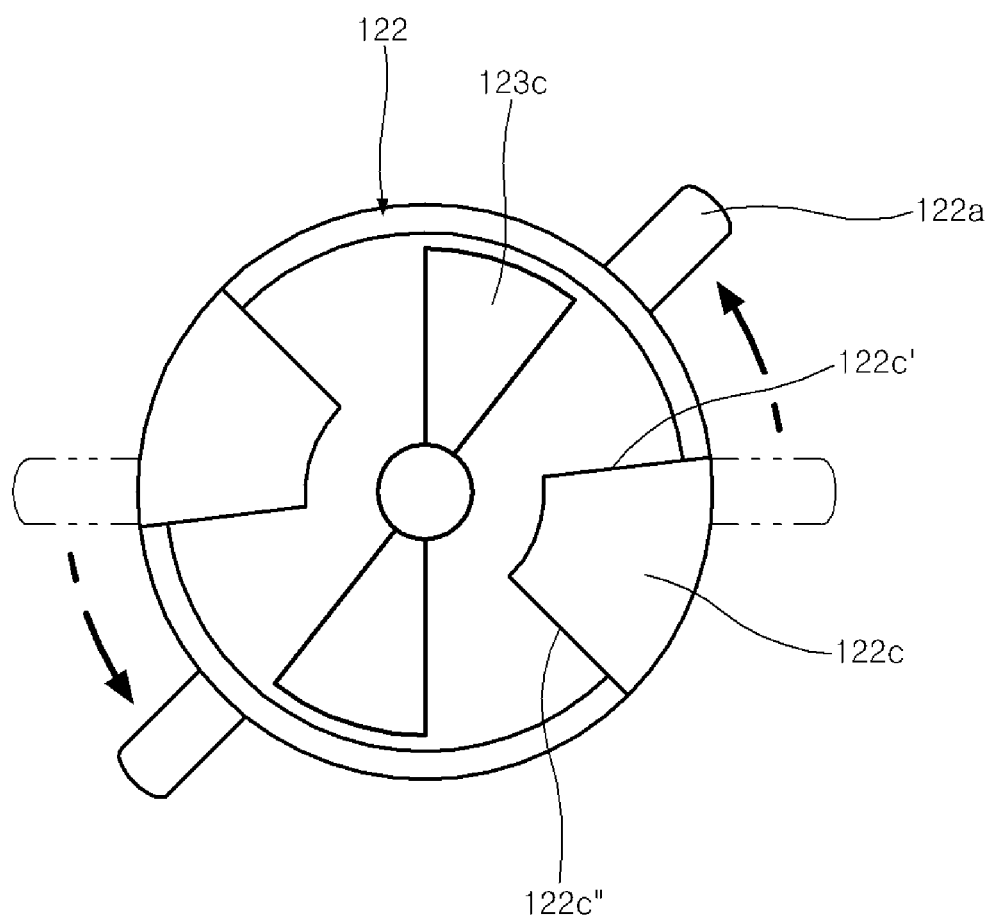
Figure 15:
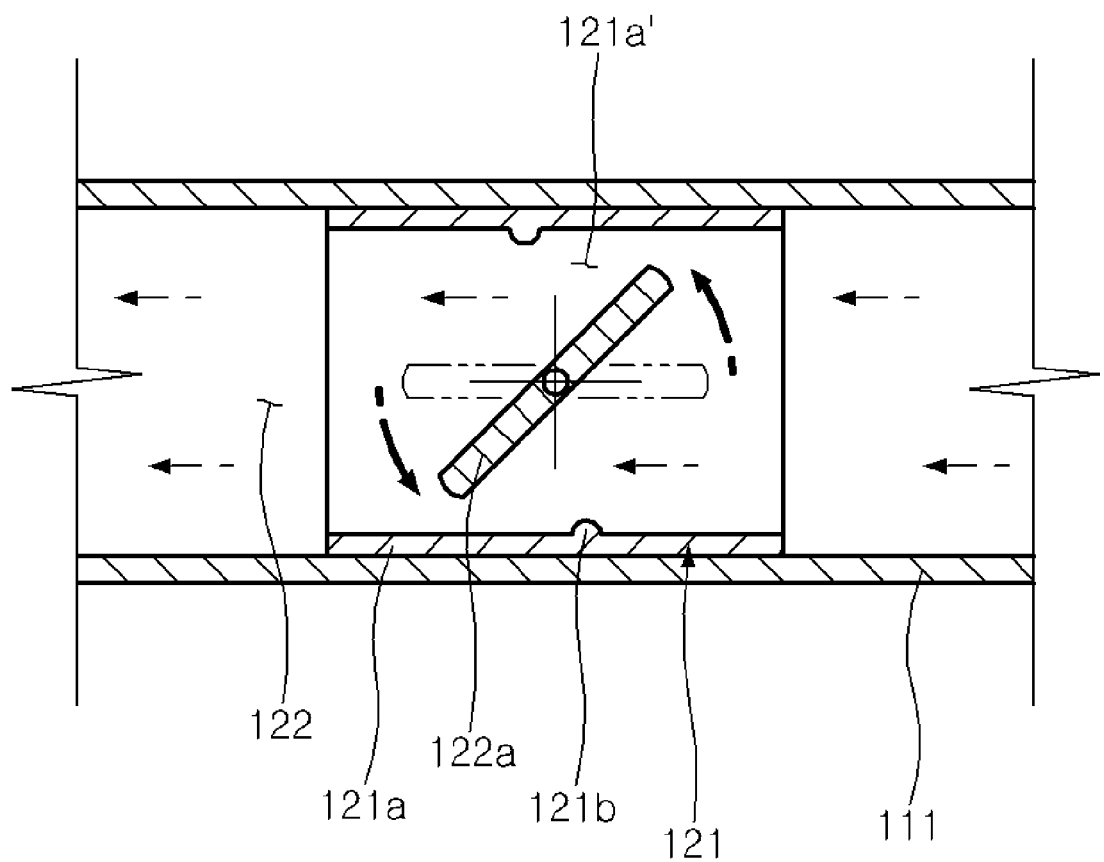
FIG. 15 is an enlarged sectional view showing a portion of FIG. 14.

When outdoor air is drawn into the flow passage 121a', the user can adjust the degree of opening of the flow passage 121a'. For this, as shown in FIGS. 13 through 15, the user rotates the roller 124b of the two rollers 124b and 124b' of the manual adjustment unit 124 that protrudes outwards through the housing 110.

When the roller 124b is rotated, the rotating force of the roller 124b rotates both the roller 124b connected to the roller 124b by the connection shaft 124c, and the timing belts 124a wrapped around the respective rollers 124b and 124b'. Then, the rotation guide shafts 122b of the dampers 122 and 122' which are connected to the timing belt 124a are rotated, whereby the on-off plates 122a are rotated. As a result, the degree of opening of the flow passage 121a' can be adjusted.

Here, when the dampers 122 and 122' are rotated, the rotation guide protrusions 122c which protrude from the ends of the rotation guide shafts 122b move away from the corresponding pressing members 123c by an angle at which the dampers 122 and 122' are rotated.

In the manual adjustment unit 124, the dampers 122 and 122' can be rotated by the rollers 124b and 124b' by an angle corresponding to a space between the pressing members 123c of the drive unit 123 and the rotation guide protrusions 122c of the dampers 122 and 122'. In other words, the dampers 122 and 122' can be rotated until the rotation guide protrusions 122c come into contact with the corresponding pressing members 123c. As such, because the degree of opening of the flow passage 121a' can be adjusted by rotating the dampers 122 and 122' using the rollers 124b and 124b', outdoor air can be prevented from being rapidly drawn into the flow passage 121a' through the inlet port 112', thus preventing rapid variation in temperature of indoor air.

Furthermore, the angle to which the dampers 122 and 122' are rotated may be controlled to a variety of values by adjusting an angle of rotation of the motor 123a under the control of the control unit 140 in response to the carbon dioxide sensor 160, the temperature sensor (not shown) and the air flow sensor 150.

Figure 16:
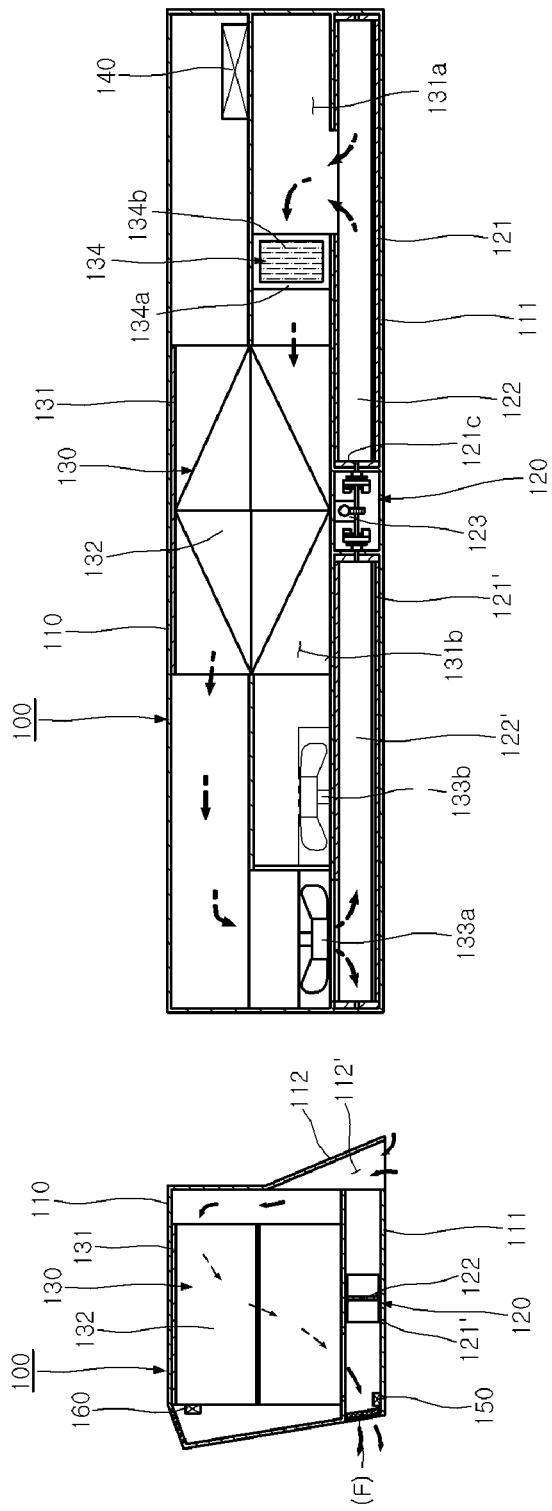
FIG. 16 is a view showing the operation of the natural ventilation unit according to the present invention.
Figure 17:
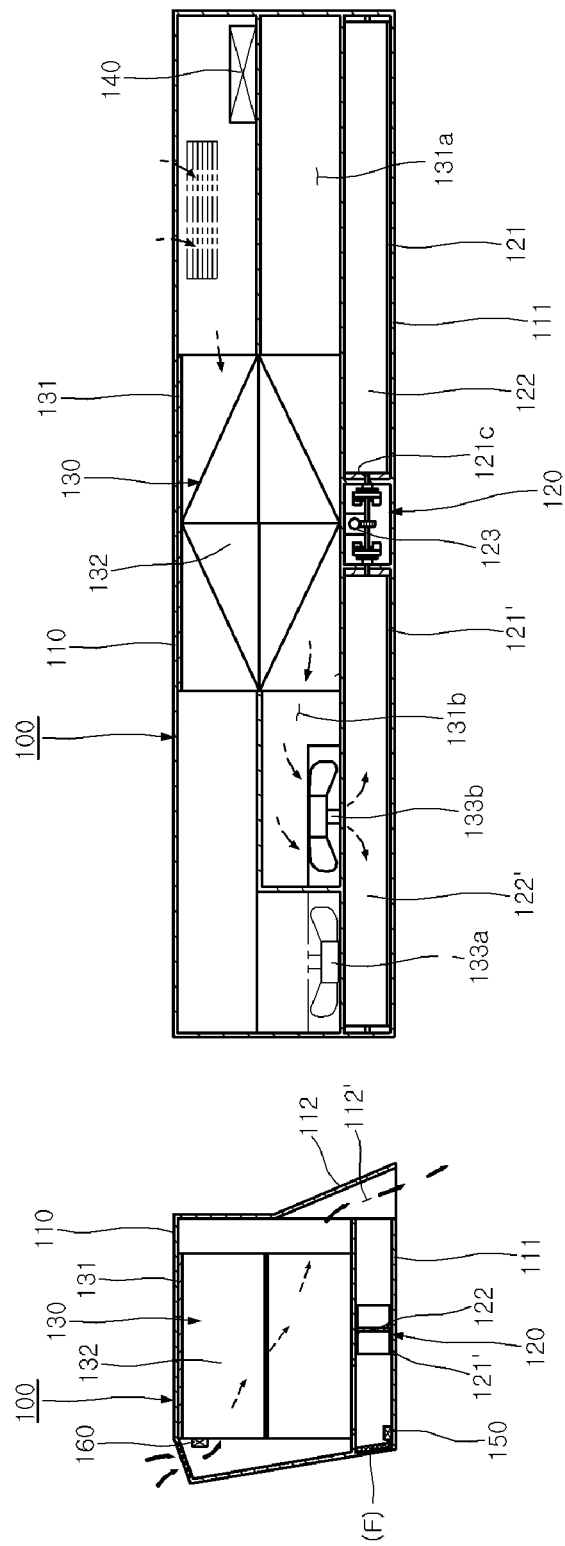
FIG. 17 is a view showing the operation of the forced ventilation unit according to the present invention.

As shown in FIG. 16, while the natural ventilation operation is carried out, if the degree of pollution of indoor air that is measured by the carbon dioxide sensor 160 is not improved, or if a forced ventilation operation is required by the user, as shown in FIG. 17, the forced ventilation unit 130 is operated under the control of the control unit 140. First, the motor 123a of the drive unit 123 is reversely operated by the control unit 140. Then, the worm gear 123b coupled to the output shaft of the motor 123a is also reversely rotated.

Then, the pressing members 123c which are connected to the worm gear 123b in the direction crossing the output shaft of the motor 123a are also reversely rotated. At this time, if the dampers 122 and 122' have been in the state in which they have been rotated in the normal direction, the pressing members 123c directly press the second surfaces 122c" of the rotation guide protrusions 122c of the dampers 122 and 122'. If the dampers 122 and 122' have been in the state in which the angles of rotation thereof have been adjusted by the manual adjustment unit 124, the pressing members 123c are rotated to a predetermined angle before pressing the second surfaces 122c" of the rotation guide protrusions 122c of the dampers 122 and 122'.

When the pressing members 123c press the second surfaces 122c" of the rotation guide protrusions 122c of the dampers 122 and 122', the rotation guide shafts 122b provided with the rotation guide protrusions 122c are rotated in the corresponding rotation guide holes 121c. Then, the on-off plates 122a which are integrally provided on the rotation guide shafts 122b are reversely rotated, and the edges of the of-off plates 122a are brought into close contact with the flow passage closing protrusions 121b, thus closing the flow passage 121a' of the natural ventilation members 121 and 121'. The motor 123a of the drive unit 123 is reversely rotated to 90° from the set state such that the on-off plates 122a of the dampers 122 and 122' are maintained perpendicular to the ventilation body 121a.

After the flow passage 121a' is closed by the rotation of the dampers 122 and 122', when the motor 123a of the drive unit 123 is rotated in the normal direction under the control of the control unit 140, the worm gear 123b coupled to the output shaft of the motor 123a is rotated in the normal direction. Then, the pressing members 123c connected to the worm gear 123b are rotated in the normal direction by the normal-directional rotation of the worm gear 123b and are thus brought into contact with the first surfaces 122c' of the rotation guide protrusion 122c.

After the flow passage 121'a has been closed by the rotation of the dampers 122 and 122', the supply fan 133a and the exhaust fan 133b of the forced ventilation unit 130 are operated under the control of the control unit 140. When outdoor air is drawn into the inlet port 112' of the housing 110 by the rotation of the supply fan 133a, the filter 134 provided on the front end of the inlet passage 131a filters out impurities from the air.

The filter 134 has a double filtering structure in which the high efficiency filter 134a is covered with the prefilter 134b. The filter 134 functions to filter out yellow dust or fine dust and sterilize air. Outdoor air that has passed through the filter 134 is moved to the heat exchange element 132 which is installed at the junction between the inlet passage 131a and the exhaust passage 131b of the forced ventilation member 131

Furthermore, indoor air is drawn into the front end of the exhaust passage 131b through a grille (not shown) by rotation of the exhaust fan 133b and then is moved to the heat exchange element 132. In the heat exchange element 132, heat exchange between high temperature indoor air moved to the exhaust passage 131b and low temperature outdoor air drawn into the inlet passage 131a is performed. That is, low temperature outdoor air receives heat from high temperature indoor air. Thus, the outdoor air that has been increased in temperature and the indoor air that has been reduced in temperature respectively move to the rear ends of the inlet passage 131a and the exhaust passage 131b.

The case where the temperature of outdoor air is lower than that of indoor air refers to winter. In the case of summer, the temperature of outdoor air should be explained as being higher than that of indoor air.

The heat exchange element 132 is disposed at the junction between the inlet passage 131a and the exhaust passage 131b of the forced ventilation member 131. The forced ventilation member 131 provided with the heat exchange element 132 is closely mounted to the sidewall of the housing 110 that is in the indoor side of the building. That is, because the forced ventilation member 131 is disposed at a position spaced apart from a sidewall of the housing 110 that is disposed outdoors, outdoor cold or hot air can be prevented from being directly transferred to the heat exchange element 132. Thus, heat exchange efficiency can be prevented from being rapidly reduced, especially considering the characteristics of the apparatus in which supply of air and exhaust of air are conducted at the same time.

Outdoor air which moves to the rear end of the inlet passage 131a through the heat exchange element 132 is drawn into the interior of the building via the air flow sensor 150 provided in the flow passage 121a' of the natural ventilation member 121'. Simultaneously, indoor air which moves to the rear end of the exhaust passage 131b through the heat exchange element 132 is moved to the flow passage 121a' of the natural ventilation member 121'. Here, because the flow passage 121a' is closed by the damper 122, indoor air is exhausted to the outside only through the inlet port 112'.

The air flow sensor 150 measures the flow and pressure of air, and the control unit 140 controls the supply fan 133a and the exhaust fan 133b based on the result of the measurement of the air flow sensor 150, thus adjusting the flow rat of air.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

The invention claimed is:

1. A hybrid ventilation apparatus (100) for naturally and forcedly ventilating indoor air of a building, comprising:
    a housing (110) comprising: a base plate (111) on which a natural ventilation unit (120) for naturally ventilating indoor air of the building and a forced ventilation unit (130) for forcedly ventilating the indoor air are installed; and a cover (112) mounted to the base plate (111), the cover (112) receiving and protecting the natural ventilation unit (120) and the forced ventilation unit (130) therein, with an inlet port (112') provided on the cover (112), the inlet port (112') being open downwards;
    a natural ventilation unit (120) installed in the housing (110), the a natural ventilation unit (120) having therein flow passage (121a') communicating with the inlet port (112'), wherein a worm gear (123b) is rotated in a normal direction by drive force of a drive unit (123) under control of a control unit (140) and, simultaneously, pressing members (123c) that protrude from the worm gear (123b) engage with rotation guide protrusions (122c) and rotates dampers (122) and (122') and open the flow passage (121a'), and after the flow passage (121a') has been opened, the worm gear (123b) is reversely rotated by drive force of the drive unit (123) to return the pressing members (123c) to original positions thereof, and rollers (124b) and (124b') are rotated upwards or downwards by a user so that the dampers (122) and (122') are rotated, whereby a degree of opening of the flow passage (121a') is adjusted such that the indoor air is naturally ventilated through the flow passage (121'a);
    a forced ventilation unit (130) comprising a forced ventilation member (131) provided above the natural ventilation unit (120) and closely mounted to a sidewall of the housing (110) that is in an indoor side of the building, the forced ventilation unit (130) having a heat exchange element (132) therein, the forced ventilation unit (130) comprising a supply fan (133a) and an exhaust fan (133b) rotating to forcedly ventilate the indoor air under control of the control unit (140), and an air flow sensor (150) installed in an end of the flow passage (121a') to measure a flow and pressure of air.

2. The hybrid ventilation apparatus of claim 1, wherein the natural ventilation unit (120) comprises:
    a pair of natural ventilation members (121) and (121') installed on the base plate (111) of the housing (110) in such a way that the natural ventilation members (121) and (121') face with each other, and the inlet port (112') and the flow passage (121a') communicate with each other;
    the dampers (122) and (122') respectively provided in the natural ventilation members (121) and (121'), the dampers (122) and (122') being rotated by pressurization of the pressing members (123c) that are rotated by the drive force of the drive unit (123), thus opening or closing the flow passage (121a'); and
    a manual adjustment unit (124) rotating, upwards or downwards, the dampers (122) and (122') that have been rotated to open the flow passage (121a'), thus adjusting the degree of opening of the flow passage (121a').

3. The hybrid ventilation apparatus of claim 2, wherein each of the natural ventilation members (121) and (121') comprises;
    a rectangular ventilation body (121a) through which the flow passage (121a') is formed;
    a flow passage closing protrusion (121b) provided on an inner surface of the flow passage (121a') of the ventilation body (121a) so that the damper (122), (122') that is reversely rotated under control of the control unit (140) comes into close contact with the flow passage closing protrusion (121b) so as to close the flow passage (121a'); and
    rotation guide holes (121c) formed in respective opposite ends of the ventilation body (121a), the corresponding damper (122), (122') being rotatably installed in the ventilation body (121a) by the rotation guide holes (121c).

4. The hybrid ventilation apparatus of claim 2, wherein each of the dampers (122) and (122') comprises:
    an on-off plate (122a) opening or closing the flow passage (121a');
    rotation guide shafts (122b) provided on respective opposite ends of the on-off plate (122a) and disposed in the respective rotation guide holes (121c) of the natural ventilation member (121); and
    rotation guide protrusions (122c) protruding from ends of the respective rotation guide shafts (122b) and facing each other.

5. The hybrid ventilation apparatus of claim 2, wherein the drive unit (123) comprises:
    a motor (123a) provided with an output shaft;
    the worm gear (123b) coupled to the output shaft to transmit the drive force of the motor (123a); and
    the pressing members (123c) connected to the worm gear (123b) and extending in a direction crossing the output shaft, the pressing members (123c) pressing the rotation guide protrusions (122c) of the corresponding dampers (122) and (122').

6. The hybrid ventilation apparatus of claim 2, wherein the manual adjustment unit (124) comprises:
    timing belts (124a) respectively connecting the rollers (124b) and (124b') to the rotation guide shafts (122b) of the dampers (122) and (122');
    the rollers (124b) and (124b') connected to the timing belts (124a) to rotate the corresponding dampers (122) and (122'); and
    a connection shaft (124c) connecting the rollers (124b) and (124b') to each other.

7. The hybrid ventilation apparatus of claim 6, wherein an end of any one of the rollers (124b) and (124b') protrudes out of the housing (110) through a guide hole (113) formed in the housing (110).

8. The hybrid ventilation apparatus of claim 1, wherein the forced ventilation unit (130) comprises:
- a forced ventilation member (131) provided above the natural ventilation unit (120), the forced ventilation member (131) having an inlet passage (131a) and an exhaust passage (131b) that are formed crossing each other;
- the heat exchange element (132) disposed at a junction between the inlet passage (131a) and the exhaust passage (131b) so that heat exchange between air that flows through the inlet passage (131a) and the exhaust passage (131b) is conducted in the heat exchange element (132); and
- the supply fan (133a) and the exhaust fan (133b) respectively installed in a rear end of the inlet passage (131a) and a front end of the exhaust passage (131b) so as to move air.

9. The hybrid ventilation apparatus of claim 8, further comprising
- a filter (134) provided in a front end of the inlet passage (131a) so as to filter out impurities from air.

10. The hybrid ventilation apparatus of claim 8, wherein the filter (134) has a double filtering structure in which a high efficiency filter (134a) is covered with a prefilter (134b).

11. A hybrid ventilation apparatus (100) for naturally and forcedly ventilating indoor air of a building, comprising:
- a housing (110) comprising: a base plate (111) on which a natural ventilation unit (120) for naturally ventilating indoor air of the building and a forced ventilation unit (130) for forcedly ventilating the indoor air are installed; and a cover (112) mounted to the base plate (111), the cover (112) receiving and protecting the natural ventilation unit (120) and the forced ventilation unit (130) therein, with an inlet port (112') provided on the cover (112), the inlet port (112') being open downwards;
- a natural ventilation unit (120) installed in the housing (110), the a natural ventilation unit (120) having therein flow passage (121a') communicating with the inlet port (112'), wherein a worm gear (123b) is rotated in a normal direction by drive force of a drive unit (123) under control of a control unit (140) and, simultaneously, pressing members (123c) that protrude from the worm gear (123b) engage with rotation guide protrusions (122c) and rotates dampers (122) and (122') and open the flow passage (121a'), and after the flow passage (121a') has been opened, the worm gear (123b) is reversely rotated by drive force of the drive unit (123) to return the pressing members (123c) to original positions thereof, and rollers (124b) and (124b') are rotated upwards or downwards by a user so that the dampers (122) and (122') are rotated, whereby a degree of opening of the flow passage (121a') is adjusted such that the indoor air is naturally ventilated through the flow passage (121'a);
- a forced ventilation unit (130) comprising a forced ventilation member (131) provided above the natural ventilation unit (120) and closely mounted to a sidewall of the housing (110) that is in an indoor side of the building, the forced ventilation unit (130) having a heat exchange element (132) therein, the forced ventilation unit (130) comprising a supply fan (133a) and an exhaust fan (133b) rotating to forcedly ventilate the indoor air under control of the control unit (140); and
- a carbon dioxide sensor (160) provided at a predetermined position in the housing (110), the carbon dioxide sensor (160) measuring a degree of pollution of indoor air so that the control unit (140) determines whether operating the forced ventilation unit (130) based on a result of the measurement of the carbon dioxide sensor (160).

12. A hybrid ventilation apparatus (100) for naturally and forcedly ventilating indoor air of a building, comprising:
- a housing (110) comprising: a base plate (111) on which a natural ventilation unit (120) for naturally ventilating indoor air of the building and a forced ventilation unit (130) for forcedly ventilating the indoor air are installed; and a cover (112) mounted to the base plate (111), the cover (112) receiving and protecting the natural ventilation unit (120) and the forced ventilation unit (130) therein, with an inlet port (112') provided on the cover (112), the inlet port (112') being open downwards;
- a natural ventilation unit (120) installed in the housing (110), the a natural ventilation unit (120) having therein flow passage (121a') communicating with the inlet port (112'), wherein a worm gear (123b) is rotated in a normal direction by drive force of a drive unit (123) under control of a control unit (140) and, simultaneously, pressing members (123c) that protrude from the worm gear (123b) engage with rotation guide protrusions (122c) and rotates dampers (122) and (122') and open the flow passage (121a'), and after the flow passage (121a') has been opened, the worm gear (123b) is reversely rotated by drive force of the drive unit (123) to return the pressing members (123c) to original positions thereof, and rollers (124b) and (124b') are rotated upwards or downwards by a user so that the dampers (122) and (122') are rotated, whereby a degree of opening of the flow passage (121a') is adjusted such that the indoor air is naturally ventilated through the flow passage (121'a); and
- a forced ventilation unit (130) comprising a forced ventilation member (131) provided above the natural ventilation unit (120) and closely mounted to a sidewall of the housing (110) that is in an indoor side of the building, the forced ventilation unit (130) having a heat exchange element (132) therein, the forced ventilation unit (130) comprising a supply fan (133a) and an exhaust fan (133b) rotating to forcedly ventilate the indoor air under control of the control unit (140),
- wherein the forced ventilation unit (130) comprises:
- the forced ventilation member (131) provided above the natural ventilation unit (120), the forced ventilation member (131) having an inlet passage (131a) and an exhaust passage (131b) that are formed crossing each other;
- the heat exchange element (132) disposed at a junction between the inlet passage (131a) and the exhaust passage (131b) so that heat exchange between air that flows through the inlet passage (131a) and the exhaust passage (131b) is conducted in the heat exchange element (132); and
- the supply fan (133a) and the exhaust fan (133b) respectively installed in a rear end of the inlet passage (131a) and a front end of the exhaust passage (131b) so as to move air.

* * * * *